Sept. 7, 1948.  H. M. CASSEL  2,448,768
METHOD AND APPARATUS FOR MEASURING SURFACE TENSION
Filed March 29, 1945
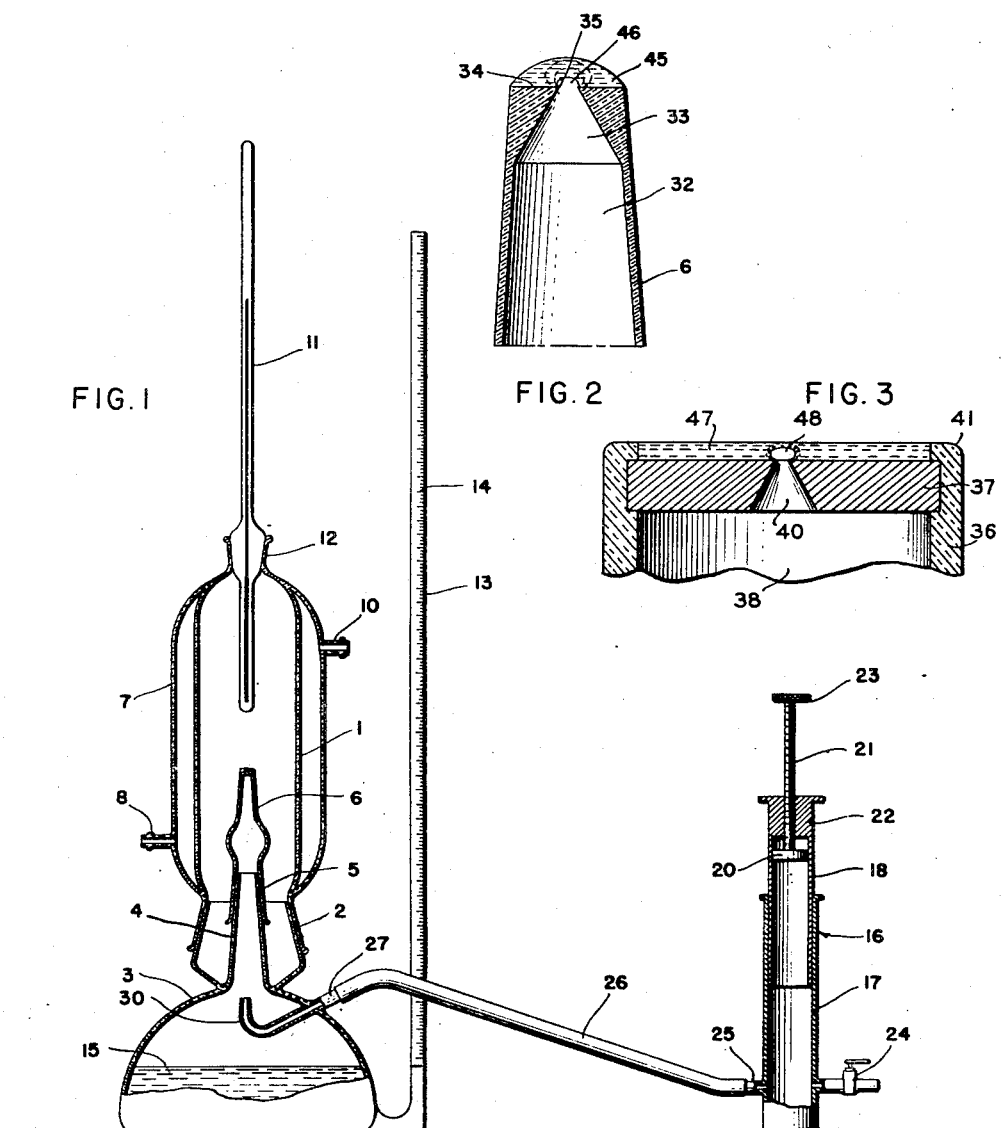
Inventor
HANS M. CASSEL
E. A. Oxxx.
By
Agent Patented Sept. 7, 1948

2,448,768

UNITED STATES PATENT OFFICE 2,448,768

METHOD AND APPARATUS FOR MEASURING SURFACE TENSION

Hans M. Cassel, Plainfield, N. J.

Application March 29, 1945, Serial No. 585,411

10 Claims. (Cl. 73—53)

1

This invention relates to a novel method of and device for measuring interfacial tension, and more particularly to a tensiometer for determining the surface tension of liquids by the maximum bubble pressure method.

Surface tension is defined as the work required to produce, in a reversible way, a unit area of the surface of a liquid. The surface tension is an important physical characteristic of liquids, and many methods of measuring it have been devised for scientific purposes. Measurements of the surface tension are indispensable in colloid chemistry, as the principal means of studying the properties of mono- and polymolecular surface layers. Determinations of the surface tension carried out in industrial laboratories have assumed increasing importance in the sugar and oil industry, in the production of detergents, cosmetics, pharmaceuticals and in the biological field.

According to a conventional well known method, which is usually referred to as the Du Nouy or ring method, the surface tension is determined by measuring the maximum pull required to remove a metal ring from the liquid surface. However, when the ring is pulled away from the liquid, the surface equilibrium becomes unstable as soon as the curvature of the liquid surface within the ring differs from that of the liquid outside of the ring. Furthermore, the contact angle at the ring-liquid interface is of importance because the evaluation of the results is based on the assumption of perfect wettability. This requirement is frequently far from being met, particularly when liquid drops adhere to the ring. Thus, in case of solutions the ring method, even under favorable circumstances, allows only the determination of "dynamic" or irreversible surface tension values.

A preferred method of measuring the surface tension of liquids is the maximum bubble pressure method. Here the maximum pressure is determined that is required to force a fluid bubble through an orifice into the liquid. This method is independent of the angle of contact, that is, the angle which the liquid surface forms at the boundary with its solid support. Reversible and reproducible values of the "static" surface tension may be obtained with the maximum bubble pressure method. According to conventional practice a fluid bubble is forced through a capillary orifice into a considerable amount of liquid. The drawback of this arrangement is that a comparatively large hydrostatic head exists above the fluid bubble which must be subtracted from the measured pressure required to force the bubble through the liquid. Another drawback of the conventional

2 method is that an appreciable amount of liquid is required for a determination of the surface tension, preventing its application in many biological research problems. A further difficulty encountered with the maximum bubble pressure method as used conventionally is that the difference of the hydrostatic head around the gas bubble distorts the shape of the bubble which in turn necessitates correction of the results for an accurate evaluation thereof.

It is an object of the present invention, therefore, to provide an improved method of and device for measuring the surface tension of liquids by the maximum bubble pressure method.

A further object of the invention is to provide a surface tensiometer which permits accurate measurements of the surface tension of minute quantities of liquid, thereby to open to scientific investigation new fields of research previously inaccessible.

Another object of the invention is to provide a surface tensiometer for measuring the surface tension of a liquid without the necessity to correct for the effects of gravity on the liquid layer or on the distortion of the bubble.

In accordance with the present invention there is provided a device for measuring the surface tension of a liquid by the maximum bubble pressure method which includes a member having a flat top adapted to support a small quantity of the liquid to be measured. This member is provided with a central conical aperture having its smallest diameter at the top of the member.

Alternatively, a surface tensiometer includes a tube having a central opening therein. A thin disc is arranged in this opening which is provided with a central orifice. The disc is arranged below the upper edge of the tube to support a small quantity of liquid for measuring the surface tension thereof.

For a better understanding of the invention, together with other and further objects thereof, reference is made to the following description, taken in connection with the accompanying drawing, and its scope will be pointed out in the appended claims.

In the accompanying drawing:

Fig. 1 is a front elevational view partly in section of a surface tensiometer embodying the present invention;

Fig. 2 is a longitudinal sectional view on enlarged scale of a support for the liquid to be measured; and Fig. 3 is a longitudinal sectional view on enlarged scale of a modification of the liquid support in accordance with the invention.

Referring now more particularly to Fig. 1 of the drawing, there is shown a surface tensiometer including container 1 which may be made of glass. Container 1 is connected by ground joint 2 to glass vessel 3 having a central projection 4 bearing ground glass joint 5. Nozzle 6 is connected by joint 5 to projection 4. The construction and function of nozzle 6 will be explained in detail hereinafter.

Container 1 is surrounded by jacket 7 having two nipples 8 and 10. A cooling or heating fluid may be circulated through jacket 7 by means of nipples 8 and 10. Thermometer 11, which serves for measuring the temperature in container 1, is connected to the top of container 1 by ground joint 12 provided with longitudinal grooves, not shown, which permits communication with the atmosphere. Manometer tube 13 connected to glass vessel 3 is provided with graduations 14 to measure the pressure in glass vessel 3. A suitable manometer liquid 15 is provided in vessel 3 for measuring the pressure. Liquid 15 may, for instance, be water or a suitable oil having a low vapor pressure. The lower the specific gravity of the manometer liquid, the higher will be the rise of the liquid in manometer tube 13 for a given pressure, thus increasing the accuracy of the readings obtained.

Pump 16 serves for producing a controlled pressure in vessel 3. Pump 16 includes an outer stationary cylinder 17, in which is slidably arranged inner cylinder 18. Piston 20 provided in cylinder 18 is secured to screw 21 extending through top portion 22 of cylinder 18. Knurled head 23 on screw 21 permits rotation of screw 21 for moving piston 20 upwards or downwards. The pressure produced by pump 16 may be regulated by first depressing cylinder 18 and piston 20 as a unit. A fine adjustment of the pressure is obtained by moving piston 20 up and down in cylinder 18 by rotation of head 23.

Valve 24 is connected to the lower portion of pump 16 for admitting suitable gases. Nipple 25 is connected to rubber hose 26, the other end of which is connected to nipple 27. Nipple 27 is secured to or integral with vessel 3 and has an upwardly directed extension 30 opening into projection 4.

The upper portion of nozzle 6 is shown on enlarged scale in Fig. 2. Thick-walled glass nozzle 6 has a central aperture 32. The upper portion of aperture 32 is conical as shown at 33 with its smallest diameter at the flat top 34 of nozzle 6. Edge 35 of nozzle 6 may be made sharp for a purpose to be explained hereinafter. Surface 34 preferably is ground flat and polished. The smallest diameter of conical opening 33 may be about .002" wide.

Another embodiment of nipple 6 in accordance with the invention is illustrated in Fig. 3. The support for the liquid to be measured includes glass tube 36. A thin metal disc or diaphragm 37 is sealed into inner opening 38 of glass tube 36. Preferably, metal disc 37 consists of platinum or other metal that is chemically inert against most liquids as well as wettable thereby. Glass, for instance, is not wettable by oil, while platinum is wettable thereby. Disc 37 is provided with a central orifice 40 which may be a cylindrical bore or of conical shape, as illustrated. A tapered orifice 40 is preferred; however, a cylindrical hole 40 may be used if the thickness of diaphragm 37 is of the order of the diameter of aperture 40. The purpose of this arrangement is to reduce the length of the capillary opening to minimize the danger of plugging it up with contaminating materials. The smallest diameter or orifice 40 may be about .002". The distance of the upper surface of disc 37 from the flat top 41 of glass tube 36 may be about .001" or a little more than about half the smallest diameter of orifice 40. Flat top 41 of glass tube 36 preferably has sharp edges and is ground flat to prevent a curvature of the upper surface of the liquid resting on disc 37 depending upon the angle of contact of the liquid surface with its solid boundary.

Referring now to the operation of the surface tensiometer of the invention, container 1 should first be removed from vessel 3 to obtain access to nozzle 6. Care should be taken to carefully clean conical aperture 33 from dust particles and the like. The main reason for making aperture 33 conical is to facilitate cleaning thereof. The same applies to orifice 40 of the nozzle shown in Fig. 3. Then a drop of the liquid to be measured is put on flat top 34 of nozzle 6. Any excess of liquid may be removed by clean filter paper. The outer rim of flat surface 34 should be well wetted by the liquid so that the liquid lens 45 is as flat as possible.

Now container 1 is put back upon ground joint 2 of vessel 3. Thermometer 11 is also put on top of container 1. Care should be taken that ground joints 2 and 5 are pressure tight. Joint 12, however, permits communication of vessel 1 with the atmosphere. The temperature in container 1 can be brought to a desired value by running a hot or cold fluid through jacket 7. When the desired temperature has been reached as measured by thermometer 11, the surface tensiometer is ready for operation.

Now a suitable gas is let into pump 16. Measurements of the surface tension may, for instance, be carried out with dry air or nitrogen which may be admitted to pump 16 through valve 24. Then the pressure in vessel 3 is increased by depressing pump head 23 until a gas bubble appears in capillary opening 33 as indicated schematically at 46 in Fig. 2. It may be preferred to let gas bubble 46 age for a certain time to increase the accuracy of the observed results. At least a few minutes should pass between the formation of the bubble and the final reading to obtain surface equilibrium and to let slow currents in the liquid produced by the formation of the bubble come to rest. At this stage the pressure is increased very slowly by rotating pump head 23 to depress piston 20 in cylinder 18. The maximum pressure reached before the bubble breaks off from capillary opening 33 is read from graduations 14 on manometer tube 13. The breaking off of the bubble manifests itself in a slight kick of the manometer column.

The surface tension $\sigma$ may be calculated as follows:

$$p = \frac{2\sigma}{r}$$

where $r$ is the radius of capillary opening 33 at its top, that is, at its smallest diameter and $p$ is the pressure as determined by monometer tube 13. Hence, it will be seen that the pressure obtained becomes higher when the radius of capillary opening 33 is reduced. If the readings are taken in this manner there is no need to correct for the hydrostatic head above gas bubble 46 because this liquid head is practically negligible. Measurements carried out with the conventional method always require correction for the hydrostatic head above the gas bubble which introduces a source of error that may falsify the results. When the pressure in vessel 3 is gradually increased in the manner outlined above, gas bubble 46 increases gradually in size as indicated in Fig. 2.

It will also be seen that the bubble becomes flat at its top due to the fact that the liquid layer above gas bubble 46 is so thin that it prevents its normal or undisturbed formation. This distortion of bubble 46 causes a reduction of the capillary pressure to be overcome in breaking it away from edge 35. This in turn considerably reduces the time required to form a fresh bubble for the next reading in contradistinction to the conventional procedure. The upward direction of orifice 33 or 40 also facilitates breaking off of bubble 46. The sharpness of edge 35 serves to prevent variations of the effective aperture radius as a result of differences of the angle of contact between the fluid bubble and its solid boundary. The sharp edge of flat top 41 has the function to make the surface of liquid 47 plane and horizontal by eliminating differences of the angle of contact between the liquid and its solid boundary.

Ordinarily a correction for the distortion of the shape of the fluid bubble due to the effects of gravity would be required for precision measurements. This deviation of the bubble shape from a sphere is caused by the difference in hydrostatic head at the top and the bottom of the fluid bubble. However, this correction becomes negligible if the radius of the bubble is very small and the pressure in the bubble is large. These conditions prevail when the diameter of orifice 33 or 40 is made small.

The surface tensiometer of the invention may be used for making absolute measurements of the surface tension. All that is necessary to this end is to determine the diameter of conical opening 33 at its narrowest point. In most cases, however, it might be preferred to calibrate the instrument by measuring a known surface tension, for instance, that of pure water at any temperature. With a capillary opening of about .002" diameter, the pressures obtained with the maximum bubble pressure method amount up to about 30 cm. water pressure or about 12" of water head.

Nozzle 36 shown in Fig. 3 is particularly adapted for precision measurements of the surface tension. The tolerance of the size of orifice 40 can be kept within very narrow limits in a metal disc. Also, the distance between the upper surface of disc 37 and flat top 41 of tube 36 determines the height of liquid 47. The surface of liquid 47 will be plane and horizontal, its boundary being the sharp edged flat ground wall of glass tube 36. Gas bubble 48 is formed in the same manner as described in connection with Fig. 2. It is to be understood that glass nozzle 6 or glass tube 36 may have a ground joint connected at the bottom for attachment to projection 4 of vessel 3. The liquid support of Fig. 3 requires as little as .1 cubic centimeter liquid for a measurement of the surface tension thereof. This is a decided advantage of the micro-method of the invention over conventional surface tensiometers.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A device for measuring the surface tension of a liquid by the maximum bubble pressure method including a member having a flat top adapted to support a small quantity of the liquid to be measured, said member being provided with a central conical aperture having its smallest diameter at said top.

2. A device for measuring the surface tension of a liquid by the maximum bubble pressure method including a member having a flat top adapted to support a small quantity of the liquid to be measured, said member being provided with a central conical capillary aperture having its smallest diameter at said top and having a sharp edge at said top, thereby to minimize the effects of differences in wettability between said liquid and said member.

3. A device for measuring the surface tension of a liquid by the maximum bubble pressure method including a glass nozzle having a flat top adapted to support a small quantity of the liquid to be measured, said nozzle being provided with a central conical capillary aperture having its smallest diameter at said top and having a sharp edge at said top, thereby to minimize the effects of differences in wettability between said liquid and said nozzle.

4. A surface tensiometer including a thick-walled glass nozzle having a ground and polished flat top adapted to support a small quantity of the liquid to be measured, said nozzle being provided with a central conical capillary aperture having its smallest diameter at said top and having a sharp edge at said top, thereby to minimize the effects of differences in wettability between said liquid and said nozzle.

5. A surface tensiometer including a tube having a central opening therein, and a disc arranged in said opening, said disc being provided with a central orifice and arranged below the upper edge of said tube to support a small quantity of liquid for measuring the surface tension thereof.

6. A surface tensiometer including a glass tube having a central opening therein, and a thin metal diaphragm arranged in said opening, said diaphragm being provided with a central orifice and arranged below the upper edge of said tube to support between said diaphragm and said edge a small quantity of liquid for measuring the surface tension thereof.

7. A surface tensiometer including a glass tube having a central opening therein, and a platinum disc arranged in said opening, said disc being provided with a central capillary orifice and arranged below the upper edge of said tube to support between said disc and said edge a small quantity of liquid for measuring the surface tension thereof.

8. A surface tensiometer including a tube having a central opening therein, and a metal disc arranged in said opening, said disc being provided with a central orifice, said disc being arranged a distance substantially equal to the diameter of said orifice below the upper edge of said tube, thereby to support between said disc and said edge a small quantity of liquid for measuring the surface tension thereof.

9. A device for measuring the interfacial tension of a liquid and a fluid by the maximum droplet pressure method including a disc having a flat top, said disc being provided with a central orifice, a tube having a central opening, said disc being located in said opening and below the upper edge of said tube to support a small quantity of the liquid for measuring the interfacial tension thereof.

10. The method of measuring the interfacial tension of a liquid with a fluid bubble by means of a flat support having an aperture which comprises wetting the support with a quantity of the liquid to be measured which is just sufficient to cover entirely the support and to form a flat liquid lens, forcing a fluid bubble through the aperture into said lens, and determining the maximum pressure required to drive said bubble through the aperture.

HANS M. CASSEL.

REFERENCES CITED

The following references are of record in the file of this patent:

UNITED STATES PATENTS

| Number | Name | Date |
| --- | --- | --- |
| 1,224,142 | Collins | May 1, 1917 |
| 2,054,438 | Natelson | Sept. 15, 1936 |